(12) United States Patent
Mathews et al.

(10) Patent No.: US 11,539,158 B2
(45) Date of Patent: Dec. 27, 2022

(54) ELECTRICAL TERMINAL SEAL AND ELECTRICAL CONNECTOR CONTAINING SAME

(71) Applicant: Aptiv Technologies Limited, St. Michael (BB)

(72) Inventors: Thomas Mathews, Cortland, OH (US); Troy A. Iler, Salem, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 37 days.

(21) Appl. No.: 16/999,404

(22) Filed: Aug. 21, 2020

(65) Prior Publication Data
US 2021/0075150 A1    Mar. 11, 2021

Related U.S. Application Data

(60) Provisional application No. 62/897,571, filed on Sep. 9, 2019.

(51) Int. Cl.
*H01R 13/52* (2006.01)
*B60L 53/16* (2019.01)

(52) U.S. Cl.
CPC .......... *H01R 13/5208* (2013.01); *B60L 53/16* (2019.02); *H01R 2201/26* (2013.01)

(58) Field of Classification Search
CPC .............. H01R 13/5208; H01R 13/521; H01R 13/5213; H01R 13/5216; H01R 13/5219; H01R 13/5221; H01R 13/533; H01R 2201/26; B60L 53/16
See application file for complete search history.

(56) References Cited

U.S. PATENT DOCUMENTS 5,618,206 A *   4/1997  Sawada .............. H01R 13/5208
                                                   439/274
6,203,208 B1 *  3/2001  Stupar ..................... G02B 6/382
                                                    385/74
(Continued)

FOREIGN PATENT DOCUMENTS

CN      101971330 A     2/2011
CN      104103872 A    10/2014
(Continued)

OTHER PUBLICATIONS

Rabura Sascha. Description Translation. DE 102016107401 (Year: 2016).*

(Continued)

*Primary Examiner* — Edwin A. Leon
(74) *Attorney, Agent, or Firm* — Billion & Armitage

(57) ABSTRACT

An electrical connector assembly includes a connector housing defining a cylindrical terminal cavity, an electrical terminal having a cylindrical portion, and an electrical terminal seal. The electrical terminal seal includes a base formed of a compliant material and a cylindrical protrusion integrally formed with the base and extending from a major surface of the base. The electrical terminal seal defines a cylindrical aperture extending through the protrusion. The protrusion includes a first circumferential rib that is integrally formed with the protrusion. The first circumferential rib extends into the aperture from an inner surface of the protrusion.

16 Claims, 4 Drawing Sheets

(56) References Cited

U.S. PATENT DOCUMENTS

| | | | |
|---|---|---|---|
| 6,595,800 B2 * | 7/2003 | Yuasa | H01R 13/5208 439/587 |
| 7,371,115 B1 | 5/2008 | Hsieh et al. | |
| 8,100,716 B2 | 1/2012 | Yahya et al. | |
| 8,747,130 B2 | 6/2014 | Tyler et al. | |
| 9,192,075 B1 | 11/2015 | Cavallier et al. | |
| 9,277,683 B2 | 3/2016 | Ionescu et al. | |
| 9,655,281 B2 | 5/2017 | Harvilchuck et al. | |
| 9,949,363 B2 | 4/2018 | Nakamura | |
| 10,050,396 B2 | 8/2018 | Schwan | |
| 10,090,657 B2 | 10/2018 | Kobayashi et al. | |
| 10,148,032 B1 * | 12/2018 | Brantingham | F16L 5/10 |
| 10,490,932 B1 | 11/2019 | Schneider et al. | |
| 10,622,755 B1 | 4/2020 | Gonzalez Delgadillo et al. | |
| 10,717,367 B1 | 7/2020 | Price et al. | |
| 10,756,498 B1 | 8/2020 | Sarraf et al. | |
| 2004/0092163 A1 * | 5/2004 | Nagayasu | H01R 13/5208 439/587 |
| 2010/0254093 A1 | 10/2010 | Oota et al. | |
| 2017/0166324 A1 | 6/2017 | Smith | |
| 2017/0200537 A1 | 7/2017 | Urbaniak et al. | |
| 2019/0014654 A1 | 1/2019 | Kobayashi | |
| 2019/0074620 A1 | 3/2019 | Moseke | |
| 2020/0303093 A1 | 9/2020 | Cantz et al. | |
| 2020/0343610 A1 | 10/2020 | Agathocleous et al. | |
| 2020/0384875 A1 | 12/2020 | Rhodes et al. | |
| 2020/0391601 A1 | 12/2020 | Maeshiro | |
| 2021/0021077 A1 | 1/2021 | Mathews et al. | |
| 2021/0063097 A1 | 3/2021 | Hitchcock et al. | |
| 2022/0029329 A1 | 1/2022 | Kempf et al. | |
| 2022/0134896 A1 | 5/2022 | Chase et al. | |

FOREIGN PATENT DOCUMENTS

| | | | |
|---|---|---|---|
| DE | 102005056328 A1 | 5/2007 | |
| DE | 202008006117 U1 | 7/2008 | |
| DE | 102009041968 A1 | 4/2011 | |
| DE | 202010017443 U1 | 4/2012 | |
| DE | 102016107401 A1 | 8/2017 | |
| EP | 1536527 A1 * | 6/2005 | ......... H01R 13/5208 |
| EP | 1791223 A2 | 5/2007 | |
| EP | 2056412 A2 * | 5/2009 | ......... H01R 13/5216 |
| EP | 2242100 A1 | 10/2010 | |
| EP | 2390962 A1 * | 11/2011 | ............... H02G 3/22 |
| KR | 20090033015 A | 4/2009 | |
| WO | 2012126644 A1 | 9/2012 | |
| WO | 2013111234 A1 | 8/2013 | |

OTHER PUBLICATIONS

Extended European Search Report for EP Application No. 20195128. 2, dated Feb. 11, 2021, 8 pages.

Extended European Search Report for EP Application No. 20195130. 8, dated Feb. 2, 2021, 10 pages.

First Chinese Office Action for CN Application No. 202010940217. 6, dated Oct. 27, 2021, 8 pages.

"Office Action received for China Patent Application No. 202010940217. 6, dated Jul. 12, 2022", 10 pages.

* cited by examiner

ELECTRICAL TERMINAL SEAL AND ELECTRICAL CONNECTOR CONTAINING SAME

CROSS-REFERENCE TO RELATED APPLICATION

This application claims the benefit under 35 U.S.C. § 119(e) of U.S. Provisional Patent Application No. 62/897,571 filed on Sep. 9, 2019, the entire disclosure of which is hereby incorporated by reference.

TECHNICAL FIELD OF THE INVENTION

The present invention relates generally to electrical connectors and more particularly to sealed electrical connectors having terminals sealed to the connector housing.

BACKGROUND OF THE INVENTION

Electrical connectors may include sealing elements to inhibit ingress of environmental contaminants, e.g. dust, dirt, water, or other fluids, into the connector body that may degrade the electrical properties of the terminals. In electric vehicle charging connectors, such as those conforming to Society of Automotive Engineers (SAE) J1772, international Electrotechnical Commission (IEC) 62196, Japan Automobile Research Institute CHAdeMo, or Goubiao/T (GBT) 20234.1 standards, this sealing is important due to the high voltages carried through the connector and the outdoor operating environment the connector is expected to endure. The high voltage terminals in these connectors are typically sealed by individual O-ring type seals.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment of the invention, an electrical terminal seal is provided. The electrical terminal seal includes a base formed of a compliant material and a cylindrical protrusion integrally formed with the base and extending from a major surface of the base and defining a cylindrical aperture extending through the protrusion. The protrusion includes a first circumferential rib that is integrally formed with the protrusion and extends into the aperture from an inner surface of the protrusion.

In an example embodiment having one or more features of the electrical terminal seal of the previous paragraph, the aperture may be configured to receive an electrical terminal.

In an example embodiment having one or more features of the electrical terminal seal of the previous paragraph, the electrical terminal seal may further include a second circumferential rib that is integrally formed with the protrusion and extends from an outer surface of the protrusion.

In an example embodiment having one or more features of the electrical terminal seal of the previous paragraph, the second rib may be arranged on the outer surface opposite a location of the first rib on the inner surface.

In an example embodiment having one or more features of the electrical terminal seal of the previous paragraph, the first rib and the second rib may each have a generally semicircular cross section.

In an example embodiment having one or more features of the electrical terminal seal of the previous paragraph, the protrusion may include a plurality of the first rib and a plurality of the second rib.

In an example embodiment having one or more features of the electrical terminal seal of the previous paragraph, the protrusion, the first rib, and the second rib may be formed of the compliant material.

In an example embodiment having one or more features of the electrical terminal seal of the previous paragraph, the compliant material may be a self-bleeding, low compression set silicone rubber.

In an example embodiment having one or more features of the electrical terminal seal of the previous paragraph, the compliant material may have a Shore A durometer value in a range of 15 to 23.

In an example embodiment having one or more features of the electrical terminal seal of the previous paragraph, the electrical terminal seal may include a plurality of the protrusion.

In an example embodiment having one or more features of the electrical terminal seal of the previous paragraph, a first portion of the plurality of the protrusion may have a different diameter than a second portion of the plurality of the protrusion.

According to another embodiment of the invention, an electrical connector assembly is provided. The electrical connector assembly includes an electrical terminal having a cylindrical portion and an electrical terminal seal. The electrical terminal seal includes a base formed of a compliant material and a cylindrical protrusion integrally formed with the base and extending from a major surface of the base. The cylindrical protrusion defines a cylindrical aperture extending through the protrusion. The protrusion includes a first circumferential rib that is integrally formed with the protrusion. The first circumferential rib extends into the aperture from an inner surface of the protrusion.

In an example embodiment having one or more features of the electrical connector assembly of the previous paragraph, the protrusion may be disposed within the terminal cavity and the electrical terminal may be disposed within the aperture.

In an example embodiment having one or more features of the electrical connector assembly of the previous paragraph, the first rib may be in an interference fit with the cylindrical portion of the electrical terminal.

In an example embodiment having one or more features of the electrical connector assembly of the previous paragraph, the seal may further include a second circumferential rib integrally formed with the protrusion. The second circumferential rib extends from an outer surface of the protrusion. The second rib is in an interference fit with a wall of the terminal cavity.

According to yet another embodiment of the invention, an electrical connector assembly is provided. The electrical connector assembly includes a connector housing defining a cylindrical terminal cavity, an electrical terminal having a cylindrical portion, and a means for sealing the electrical terminal to the connector housing.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
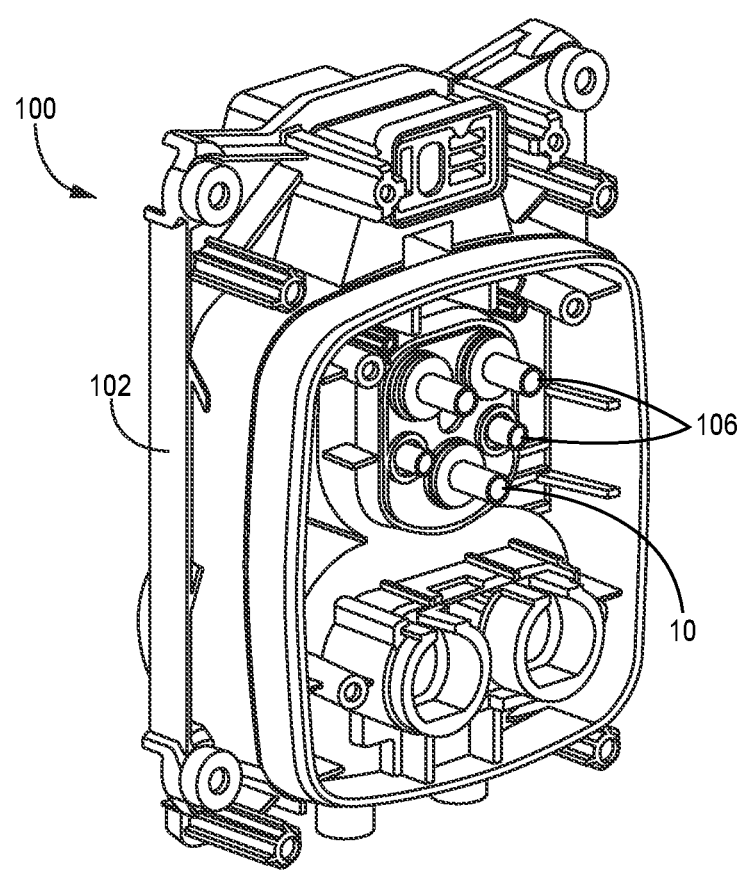
FIG. 1 is a perspective view of a subassembly of an electrical connector assembly according to some embodiments.
Figure 2:
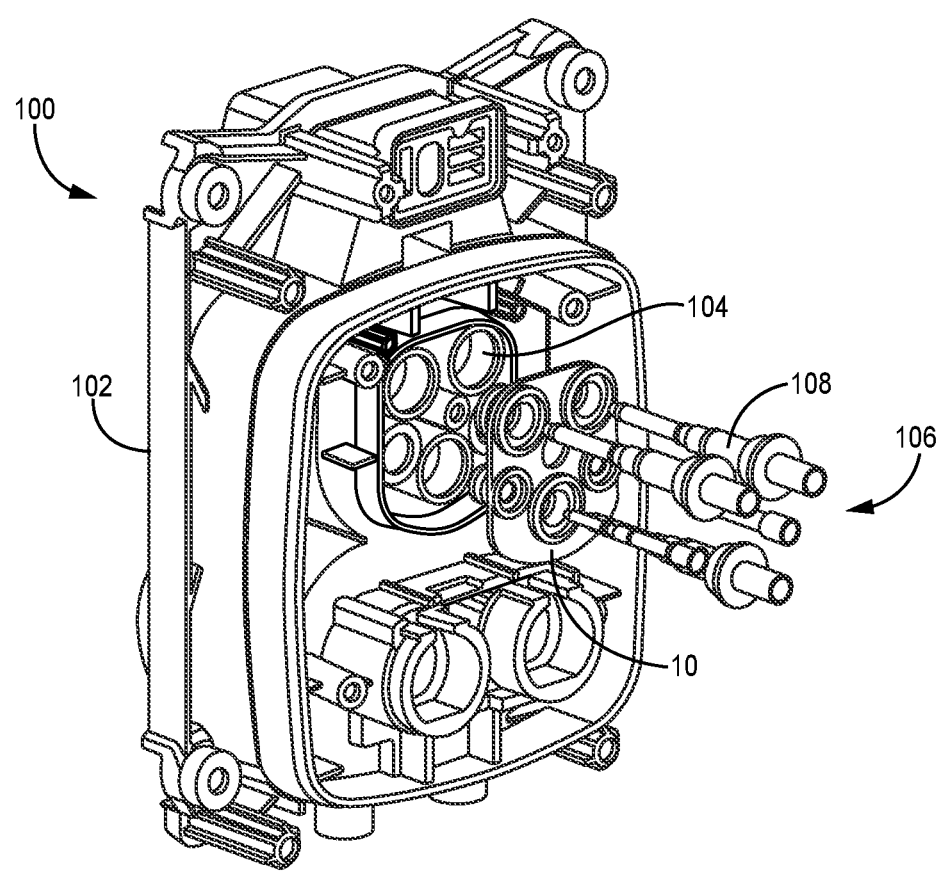
FIG. 2 is an exploded view of the subassembly of FIG. 1 according to some embodiments.
Figure 3:
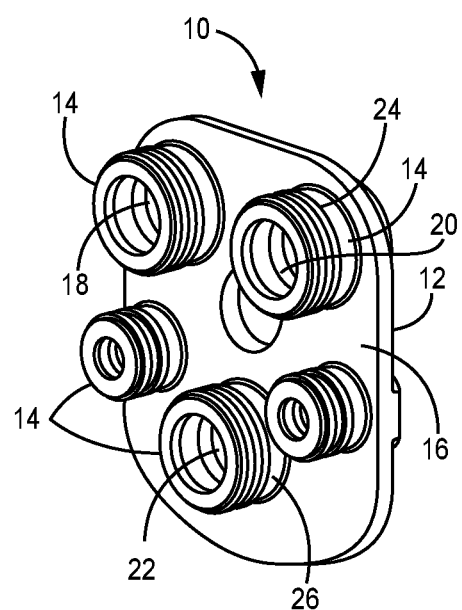
FIG. 3 is a perspective view of an electrical terminal seal of the subassembly of FIG. 1 according to some embodiments.

FIGS. 1 and 2 illustrate a non-limiting example of an electrical connector assembly 100 used to charge an electrical vehicle. The electrical connector assembly 100 includes several generally cylindrical electrical terminals 106 having and an electrical terminal seal 10 configured to seal 10 the terminals 106 to a housing 102 of the connector assembly 100. As best shown in FIG. 3, the electrical terminal seal 10 includes a base 12 formed of a compliant material and several cylindrical protrusions 14 that are integrally formed with the base 12 and extend from a major surface 16 of the base 12. Each protrusion 14 defines a cylindrical terminal aperture 18 that extends through the protrusion 14 in which one of the terminals 106 is received. The first portion of the terminals 106 may have different diameters than a second portion of the terminals 106 and a corresponding first portion of the protrusions 14 may also have different diameter than a corresponding second portion of the protrusions 14.

Figure 4:
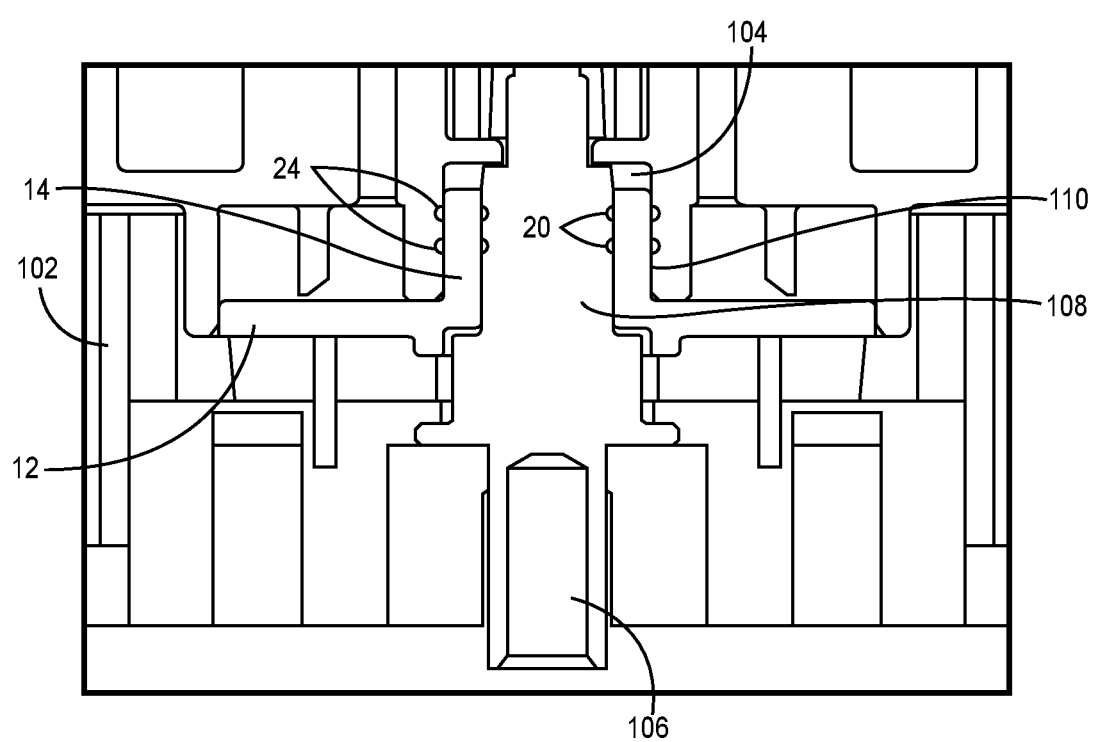
FIG. 4 is cross section view of the subassembly of FIG. 1 according to some embodiments.

Each protrusion 14 includes a first pair of circumferential ribs 20 that are integrally formed with the protrusion 14. As illustrated in FIG. 4, the first pair of ribs 20 extend into the terminal aperture 18 from an inner surface 22 of the protrusion 14 and are in an interference fit with the terminal 106 to provide compressive contact with a cylindrical portion 108 of the terminal 106. The first pair of ribs 20 provide an environmental seal to inhibit the ingress of environmental contaminants, such as dust, dirt, water, or other fluids, into the housing 102 through the terminal aperture 18.

Each of the protrusions 14 is disposed within a terminal cavity 104 of the housing 102 and the electrical terminal 106 is disposed within the aperture 18. The seal 10 further includes a second pair of circumferential ribs 24 that are integrally formed with the protrusion 14. The second pair of ribs 24 extends from an outer surface 26 of the protrusion 14 and are in an interference fit with a wall 110 of the terminal cavity 104 to provide compressive contact with the wall 110 of the terminal cavity 104. The second pair of ribs 24 provide an environmental seal configured to inhibit the ingress of environmental contaminants into the housing 102 through the terminal cavity 104.

The second pair of ribs 24 are arranged on the outer surface 26 of each protrusion 14 opposite a location of the first pair of ribs 20 on the inner surface 22 of each protrusion 14. Each rib in the first and second pair of ribs 20, 24 has the same semicircular cross section.

The base 12, each protrusion 14, each first pair of ribs 20, and each second pair of ribs 24 are integrally formed of the same compliant material. The compliant material may be a self-bleeding, low compression set silicone rubber having a Shore A durometer value in a range of 15 to 23, preferably in a range of 18 to 20, and more preferably having a value of 18.

Although the example of the terminal seal 10 shown here has a pair of first and second ribs 20, 24 on each protrusion 14, alternative embodiments of the terminal seal may be envisioned having single first and second ribs, more than two first and second ribs, only a first rib on the inner surface of the aperture, or only a second rib on the outer surface of the protrusion.

While the example presented is an electrical connector assembly, alternative embodiments of the connector assembly and/or seal may be envisioned that are configured to interconnect fiber optic cables, pneumatic tubes, hydraulic tubes, or a combination thereof.

Accordingly, an electrical terminal seal 10 and an electrical connector assembly 100 is provided. The seal 10 provides the benefits of sealing multiple electrical terminals 106 to a connector housing 102 with the sealing efficiency of individual O-ring seals without the labor required to separately apply an O-ring seal to each terminal.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of operations, direction, or orientation unless stated otherwise.

We claim:

1. An electrical connector assembly, comprising:
   a connector housing defining a cylindrical terminal cavity;
   an electrical terminal; and
   an electrical terminal seal including a base formed of a compliant material and a cylindrical protrusion integrally formed with the base and extending from a major surface of the base and defining a cylindrical aperture extending through the protrusion, wherein the protrusion includes a circumferential first rib integrally formed within the protrusion and extending into the aperture from an inner surface of the protrusion and wherein the first rib is in an interference fit with the electrical terminal.

2. The electrical connector assembly according to claim 1, wherein the aperture is configured to receive an electrical terminal.

3. The electrical connector assembly according to claim 1, wherein the compliant material is a self-bleeding, low compression set silicone rubber.

4. The electrical connector assembly according to claim 1, wherein the compliant material has a Shore A durometer value in a range of 15 to 23.

5. The electrical connector assembly according to claim 1, wherein the protrusion is disposed within the terminal cavity and wherein the electrical terminal is disposed within the aperture.

6. The electrical connector assembly according to claim 1, wherein the first rib is in an interference fit with a cylindrical portion of the electrical terminal.

7. The electrical connector assembly according to claim 1, wherein the seal further includes a second circumferential rib integrally formed with the protrusion and extending from an outer surface of the protrusion and wherein the second rib is in an interference fit with a wall of the terminal cavity.

8. The electrical connector assembly according to claim 1, further comprising a circumferential second rib integrally formed with the protrusion and extending from an outer surface of the protrusion.

9. The electrical connector assembly according to claim 8, wherein the second rib is arranged on the outer surface of the protrusion opposite a location of the first rib on the inner surface of the aperture.

10. The electrical connector assembly according to claim 8, wherein the first rib and the second rib each have a circular segment cross section.

11. The electrical connector assembly according to claim 8, wherein the protrusion includes a plurality of the first rib.

12. The electrical connector assembly according to claim 8, wherein the protrusion, the first rib, and the second rib are formed of the compliant material.

13. The electrical connector assembly according to claim 8, wherein the protrusion includes a plurality of the second rib.

14. The electrical connector assembly according to claim 8, wherein the first rib and the second rib each have a semicircular cross section.

15. The electrical connector assembly according to claim 1, wherein the electrical terminal seal includes a plurality of the protrusion.

16. The electrical connector assembly according to claim 15, wherein a first portion of the plurality of the protrusion has a different diameter than a second portion of the plurality of the protrusion.

\* \* \* \* \*